United States Patent
Vriends et al.

(10) Patent No.: US 11,773,880 B2
(45) Date of Patent: Oct. 3, 2023

(54) CONNECTOR FOR HYDRODYNAMIC APPLICATIONS EQUIPPED WITH AT LEAST ONE DETECTION SENSOR

(71) Applicant: FASTER S.P.A., Rivolta d'Adda (IT)

(72) Inventors: Stijn Leonard Vriends, Piacenza (IT); Paolo Rusconi, Rivolta d'Adda (IT); Massimiliano Ruggeri, Ferrara (IT)

(73) Assignee: FASTER S.R.L., Rivolta d'Adda (IT)

( * ) Notice: Subject to any disclaimer, the term of this patent is extended or adjusted under 35 U.S.C. 154(b) by 944 days.

(21) Appl. No.: 15/986,156

(22) Filed: May 22, 2018

(65) Prior Publication Data

US 2018/0340556 A1 Nov. 29, 2018

(30) Foreign Application Priority Data

May 25, 2017 (IT) .......................... 202017000056889

(51) Int. Cl.
*F15B 19/00* (2006.01)
*F15B 13/04* (2006.01)
(Continued)

(52) U.S. Cl.
CPC ........ *F15B 19/005* (2013.01); *F15B 13/0401* (2013.01); *F15B 13/0417* (2013.01); *F16L 37/28* (2013.01); *F16L 37/30* (2013.01); *F16L 55/07* (2013.01); *H04Q 9/00* (2013.01); *A01B 33/082* (2013.01); *A01B 63/1006* (2013.01); *E02F 3/422* (2013.01); *E02F 9/2264* (2013.01); *E02F 9/26* (2013.01); *F16L 37/56* (2013.01); *F16L 2201/10* (2013.01); *F16L 2201/60* (2013.01); *H04Q 2209/43* (2013.01); *H04Q 2209/80* (2013.01)

(58) Field of Classification Search
CPC ................ F15B 19/005; F15B 13/0401; F15B 13/0417; F16L 37/28; F16L 37/30; F16L 2201/10; A01B 63/1006; E02F 9/2264; E02F 5/145
USPC ........................................................ 73/866.5
See application file for complete search history.

(56) References Cited

U.S. PATENT DOCUMENTS 3,727,332 A * 4/1973 Zimmer .................... E02F 3/18
                                                          37/97
3,996,744 A * 12/1976 Ridge ................. F15B 13/0417
                                                          60/445

(Continued)

*Primary Examiner* — Matthew Troutman
*Assistant Examiner* — Fannie C Kee
(74) *Attorney, Agent, or Firm* — AMSTER ROTHSTEIN & EBENSTEIN LLP (57) ABSTRACT

A hydraulic connector for hydraulic circuits includes a female coupling and a male coupling which are configured to directly couple with and decouple from each other. The female and male couplings do not include inner spaces to accommodate a first sensor. A mutual connection of the female and male couplings facilitates flow of a fluid between the female and male couplings. At least either the male or female coupling includes a first hollow element which is applied directly to an external surface of the male or female coupling to define an inner space. Either the male or female coupling includes the first sensor positioned in the inner space formed by the first hollow element. The first sensor is configured to detect and transmit electronic signals corresponding to working and/or operating parameters and/or values of the connector to a receiver.

14 Claims, 5 Drawing Sheets

(51) Int. Cl.
*F16L 37/30* (2006.01)
*F16L 37/28* (2006.01)
*F16L 55/07* (2006.01)
*H04Q 9/00* (2006.01)
*F16L 37/56* (2006.01)
*A01B 63/10* (2006.01)
*A01B 33/08* (2006.01)
*E02F 3/42* (2006.01)
*E02F 9/22* (2006.01)
*E02F 9/26* (2006.01)

(56) References Cited

U.S. PATENT DOCUMENTS

| | | | | |
|---|---|---|---|---|
| 4,173,836 A * | 11/1979 | Paurat | ........................ | E02F 3/06 |
| | | | | 172/3 |
| 4,676,563 A * | 6/1987 | Curlett | ................. | H01R 13/523 |
| | | | | 285/123.3 |
| 4,703,664 A * | 11/1987 | Kirkpatrick | ............. | E21B 21/08 |
| | | | | 73/866.5 |
| 4,949,744 A * | 8/1990 | Heed | ........................ | F16K 7/10 |
| | | | | 73/866.5 |
| 5,134,853 A * | 8/1992 | Hirata | ................... | E02F 9/2225 |
| | | | | 60/420 |
| 5,711,552 A * | 1/1998 | Hogue | ................... | F16L 37/24 |
| | | | | 285/319 |
| 5,715,865 A * | 2/1998 | Wilke | ................. | F15B 13/0417 |
| | | | | 137/596 |
| 5,831,149 A * | 11/1998 | Webb | ................... | F16L 39/005 |
| | | | | 73/40.5 R |
| 6,334,308 B1 * | 1/2002 | Sato | ..................... | E02F 9/2239 |
| | | | | 60/422 |
| 6,450,553 B1 * | 9/2002 | Suresh | ................... | B21D 39/04 |
| | | | | 29/520 |
| 6,816,072 B2 * | 11/2004 | Zoratti | ................... | A62C 31/28 |
| | | | | 137/272 |
| 7,033,442 B2 * | 4/2006 | Lin | ................... | H01J 37/32844 |
| | | | | 118/663 |
| 2005/0081518 A1 * | 4/2005 | Ma | ........................ | E02F 9/2235 |
| | | | | 60/445 |
| 2005/0275557 A1 * | 12/2005 | Newberg | ................ | F16L 23/04 |
| | | | | 340/686.4 |
| 2007/0277519 A1 * | 12/2007 | Jessen | ................ | F15B 13/0417 |
| | | | | 60/462 |
| 2009/0283322 A1 * | 11/2009 | Dove | ..................... | E21B 17/06 |
| | | | | 175/40 |
| 2010/0320755 A1 * | 12/2010 | Williams | ................ | G01D 21/00 |
| | | | | 285/355 |
| 2011/0133759 A1 * | 6/2011 | Chamberlin | ........ | F16L 37/0985 |
| | | | | 324/685 |
| 2011/0262255 A1 * | 10/2011 | Defrancq | ................ | B66C 23/44 |
| | | | | 414/680 |
| 2012/0018014 A1 * | 1/2012 | Fernandes | ............ | F16L 23/006 |
| | | | | 137/561 A |
| 2012/0228271 A1 * | 9/2012 | Anzengruber | ......... | B23K 9/323 |
| | | | | 219/74 |
| 2013/0168113 A1 * | 7/2013 | Gustafson | ............ | A01B 59/043 |
| | | | | 172/1 |
| 2014/0034135 A1 * | 2/2014 | Beschorner | ........... | F15B 20/008 |
| | | | | 137/1 |
| 2014/0212222 A1 * | 7/2014 | Trottier | ................... | E02F 5/003 |
| | | | | 405/184.1 |
| 2014/0224115 A1 * | 8/2014 | Van Hooft | ............ | E02F 3/3654 |
| | | | | 91/355 |
| 2016/0084725 A1 * | 3/2016 | Hoffman | ............. | G01L 19/0681 |
| | | | | 285/41 |
| 2016/0273687 A1 * | 9/2016 | Rubinski | ................... | G01L 5/24 |
| 2016/0290516 A1 * | 10/2016 | Beschorner | ............. | F15B 13/04 |
| 2017/0089369 A1 * | 3/2017 | Wunch | ................. | G01R 31/382 |
| 2017/0089496 A1 * | 3/2017 | Lennon | ................. | F16L 13/146 |

* cited by examiner

CONNECTOR FOR HYDRODYNAMIC APPLICATIONS EQUIPPED WITH AT LEAST ONE DETECTION SENSOR

CROSS-REFERENCE TO RELATED APPLICATION

This application claims priority to Italian application no. 202017000056889, filed May 25, 2017, the content of which is incorporated by reference in its entirety.

FIELD OF INVENTION

The present invention relates to a quick connector for hydrodynamic applications, in particular for hydraulic circuits or the like, comprising a female coupling and a male coupling. In particular, the present invention relates to a quick connector of the push-pull type, in which the female and male couplings are shaped so as to be able to be reciprocally connected and disconnected by means of pushing and pulling actions, respectively. In detail, the present invention relates to a quick connector of the aforesaid type adapted to be used in the agricultural sector, in particular for using agricultural machinery in which the respective connection of the hydraulic circuits of a main tractor and of the machinery or tool or implement employed or used on each occasion is provided. In even greater detail, the present invention relates to a quick connector of the aforesaid type comprising an innovative solution for detecting at least some of the working and/or operating parameters and/or values of the quick connector.

BACKGROUND ART

Quick connectors for reciprocally connecting hydraulic circuits by means of flexible pipes are known from the prior art. For example, quick connectors of the push-pull type are known for reciprocally connecting the hydraulic circuits of a main tractor and of a tool, respectively, wherein the connection and the disconnection of the female and male couplings is obtained by means of pushing and pulling actions, respectively. Furthermore, the female and male couplings of the quick connectors are shaped so that the mechanical connection (e.g. by pushing, usually on the male coupling, in the case of the push-pull connectors) of the female and male couplings translates into the automatic positioning of the respective valve assemblies in the opening position (and thus in the hydraulic connection, so that the fluid flow between the two female and male couplings is possible), while the disconnection (by pulling, usually on the male coupling, in the case of push-pull connectors) of the female and male couplings translates into the automatic repositioning of the female and male valve assemblies in the respective closing positions (in which the hydraulic circuits are closed and separate and the fluid flow between the two female and male couplings is not possible).

The risk of improper connection and/or accidental disconnection of the male and female couplings, or even of incorrect or partial opening of the valve assembly of one or both of the female and male couplings is also well known, in particular in the case of push-pull couplings.

The risks deriving from the use, especially if prolonged, of the hydraulic circuit wherein the parameters and/or values of the circuit itself do not meet the operative specifications of the circuit or are even out of control are similarly known. For example, each hydraulic circuit is calibrated and sized as a function of a maximum pressure of the fluid, e.g. oil, wherein an oil pressure which is greater than the maximum permitted pressure, may lead to the breakage of the component parts of the circuit, e.g. to the bursting of the hydraulic lines, or may put them out of order. The same applies to the oil temperature, wherein serious damage to the circuit and/or parts thereof may arise also from an excessive oil temperature.

Modern operating machines, in particular those of the agricultural sector, are obviously equipped with devices suited to allow the setting of the hydraulic circuit; for example, solutions are known according to which the operator can set at least some of the parameters of the circuit according to requirements and/or circumstances through a touchscreen type interface. Still by way of example, in the case of a front lifter applied to an agricultural tractor, solutions are known which allow an operator to set the lifting and/or lowering speed, e.g. setting it to low values in the case of extremely heavy and/or delicate loads.

However, the known solutions do not allow a direct monitoring of the main parameters of the circuit, in particular at the various quick connectors of the circuit itself. For example, no solutions are known which provide monitoring the actual fluid-dynamic connection of the male and female couplings. Indeed, to date, an operator can only realize that the connection of the couplings of a connector is missing or incorrect as a consequence of the impossibility of obtaining the desired action. In practice, the operator realizes that the male and female couplings of a particular connector are disconnected or connected incorrectly, only if the operator realizes that the requested operation, such as the lifting of the front loader and/or the rotation of a rotary tool, is not actually possible. However, these are dearly indirect controls, wherein the operator faced with the impossibility of obtaining the desired operation, is required to infer and seek the actual reason for the failed response by the circuit and/or the possible failure.

SUMMARY OF THE INVENTION

It is the main object of the present invention to overcome, or at least minimize, the drawbacks affecting the solutions according to the prior art.

In particular, it is an object of the present invention to suggest and provide a solution which allows the direct monitoring of at least the main parameters of a hydraulic circuit, in particular at a connector, e.g. a quick connector and/or of the push-pull type.

It is a further object of the present invention to provide a solution which allows to directly verify the incorrect connection of the couplings of a connector, in particular of a quick connector.

It is further an object of the present invention to provide a solution of the aforesaid type which is characterized by low costs, and which can be made and installed by means of simple and quick operations, and wherein its installation on connectors of known type does not require any modifications, or at least no substantial ones, to the connectors themselves.

The present invention arises from the general consideration according to which the predetermined objects can be achieved by equipping a connector (one or both couplings thereof) with one or more detection sensors of predetermined parameters, either housed inside or alternately arranged outside of one or both couplings.

According to the present invention, further advantages will be obtainable by using one or more sensors configured to communicate, e.g. in BLUETOOTH mode, but possibly via WI-FI or even simply in wireless mode with a controller or communication unit and/or data collection unit.

In view of the objects summarized above, the drawbacks affecting the prior art and aforesaid considerations, the present invention relates to a connector, e.g. quick connector, for hydrodynamic applications, in particular for hydraulic circuits or the like, said connector comprising a female coupling and a male coupling suited to be alternatively connected to and disconnected from each other, wherein the mutual connection of said female and male coupling translates into the possible flow of a fluid between said female and male couplings, wherein at least either said male or female coupling comprises a first detection sensor configured to detect working and/or operating parameters and/or values of said connector.

According to an embodiment, said female coupling comprises an outer hollow main assembly, wherein said first detection sensor is housed inside said outer hollow main assembly.

According to an embodiment, said first sensor is configured to detect whether said male and female couplings are connected correctly.

According to an embodiment, said first sensor is configured to detect at least one of the following parameters: absence or presence of fluid flow between said male and female couplings, pressure value of said fluid inside said quick connector, temperature value of said fluid inside said connector.

According to an embodiment, the second of said male and female couplings also comprises a second detection sensor configured to detect working and/or operating parameters and/or values of said connector.

According to an embodiment, either one of said first and second sensors is configured to detect the pressure of said fluid inside said male coupling and in the absence of connection between said male and female couplings.

The present invention also relates to an integrated system comprising at least one female or respectively male coupling of a quick connector according to any one of the embodiments summarized above, wherein it also comprises a communication unit, wherein said communication unit and said first and/or second sensors are configured to communicate with each other in such a way to allow at least the transmission of said parameters and/or values from said first and/or second sensor to said communication unit.

According to an embodiment, said communication unit and said first and/or second sensors are configured to communicate with each other in BLUETOOTH mode or also possibly via WI-FI or even simply in wireless mode.

According to an embodiment, said communication unit is configured in such a way as to allow the comparison between the parameters and/or values detected by said first and/or second sensors and corresponding predetermined parameters and/or values, and to generate a warning and/or alarm signal if the differences between detected parameters and/or values and the default parameters and/or values are higher than predetermined tolerances.

The present invention further relates to an operating machine comprising an hydraulic circuit and equipped with at least one female or respectively male coupling of a quick connector according to one of the embodiments summarized above, wherein said female or respectively male coupling comprises said first sensor.

According to an embodiment, said operating machine is equipped with a system according to any one of the embodiments summarized above.

According to an embodiment, said operating machine comprises a control unit with an operator interface, wherein said control unit and said communication unit are configured to communicate with each other.

According to an embodiment, the communication between said control and/or management unit and/or said communication unit is such as to allow the verification of said parameters and/or values by an operator through said interface.

It is further an object of the present invention a tool or implement suited to be operatively connected to the corresponding hydraulic circuit of a main operating machine equipped with at least one female or respectively male coupling of a quick connector according to one of the embodiments summarized above, wherein said female or respectively male coupling comprises said second sensor.

Finally, it is an object of the present invention an operating machine-tool system which comprises an operating machine according to any one of the embodiments summarized above and a tool according to the embodiment illustrated above.

Further possible embodiments of the present invention are defined by the claims.

BRIEF DESCRIPTION OF THE DRAWINGS

Hereinafter, the present invention will be explained by means of the following detailed description of the embodiments depicted in the drawings. However, the present invention is not limited to the embodiments described hereinafter and depicted in the drawings; conversely, all the variants of the embodiments described below and depicted in the drawings which will be apparent to a person skilled in the art are comprised within the scope of the present invention.

In the drawings.

DETAILED DESCRIPTION OF THE INVENTION

Figure 1:
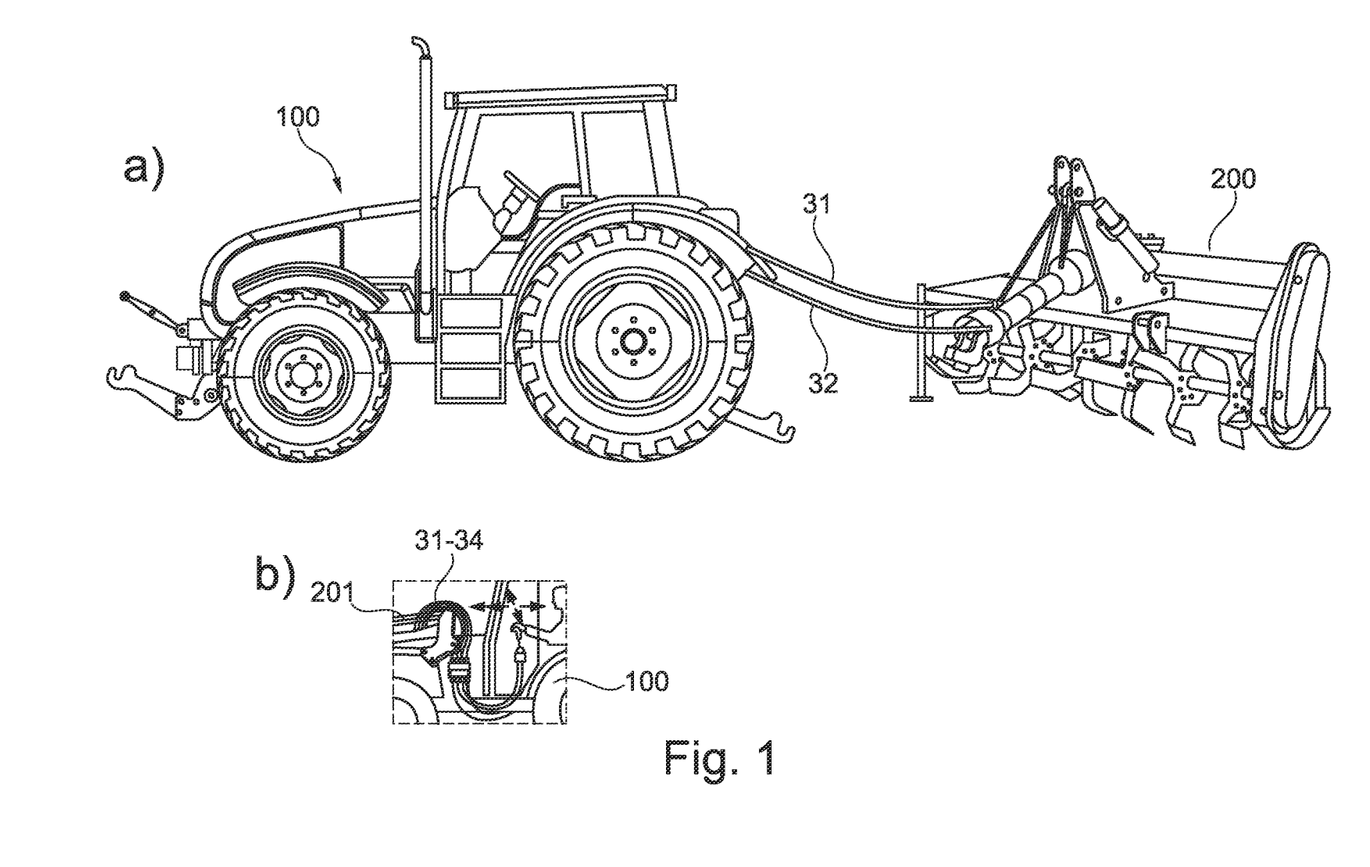
FIG. 1 shows schematic views of possible applications of the present invention.

In FIG. 1, reference numerals 100 and 200 identify an agricultural tractor and a tool or implement, respectively, particularly a rototiller adapted to be used by means of the tractor 100, wherein the examples depicted in FIG. 1 are to be considered as non-limiting, being the applications of the present invention (see description below) not limited to the agricultural sector but also comprising operating machines and tools, implements and machinery of other sectors, such as, for example, that of earth-moving, constructions and/or demolition machines, and the like. Similarly, the tractor 100 is depicted as being equipped with front loader 201 (see the box of FIG. 1b). Both the tool (rototiller) 200 and the front loader 201 for performing given operations exploit the hydrodynamic power made available by the tractor 100 and, for this purpose, the hydraulic circuits of the tool (rototiller) 200 and of the front loader 201 are connected to the hydraulic circuit of the tractor 100 by hydraulic pipes (flexible, in the example as depicted) 31 and 32 in the case of tool (rototiller) 200 and from 31 to 34 in the case of front loader 201.

Figure 2:
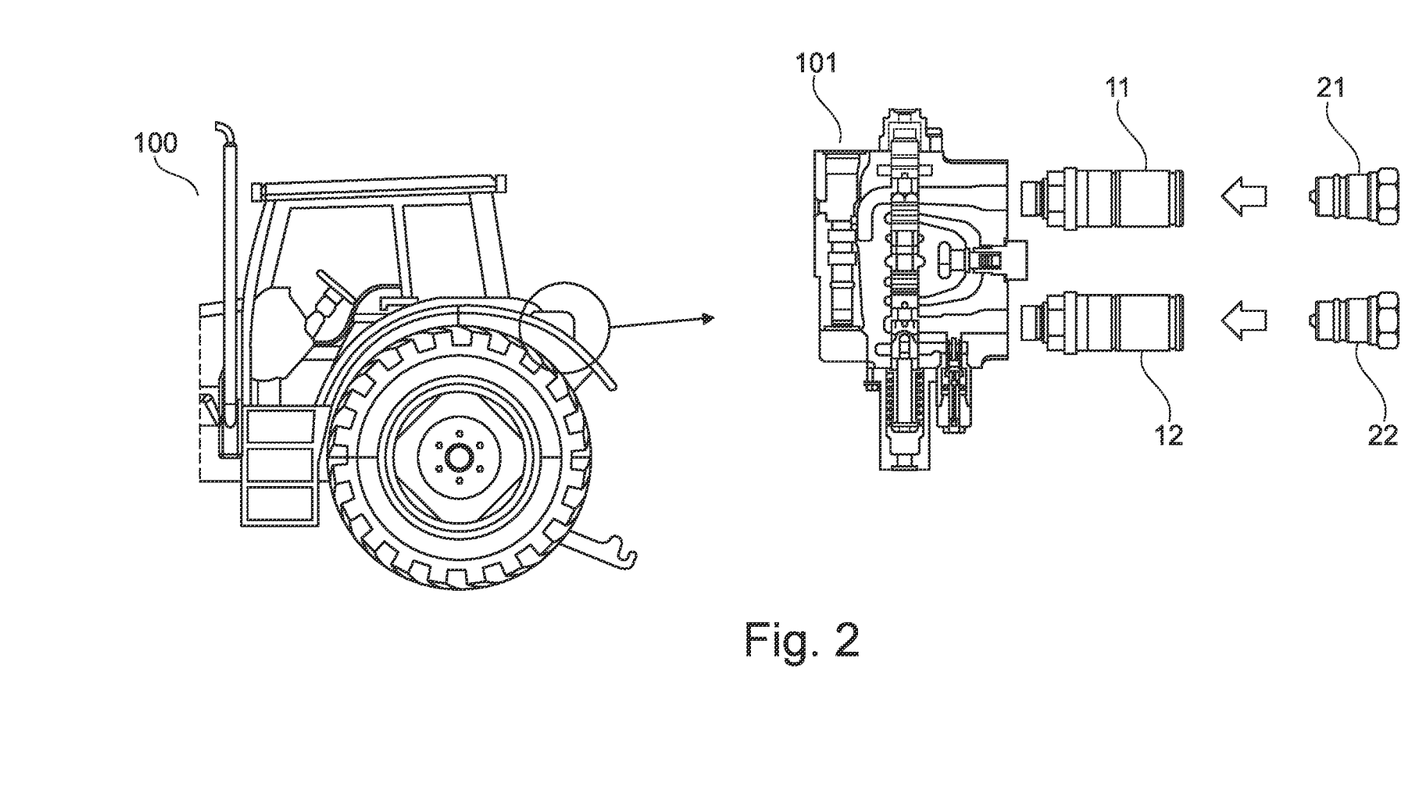
FIG. 2 shows a schematic view of a first embodiment of the invention.

For the purpose, as depicted in FIG. 2, the tractor 100 is equipped with a terminal assembly 101 (also referred to as valve assembly or hydrodynamic distributor) of the respective hydraulic circuit, the assembly 101 being provided for connecting the hydraulic circuit of the tractor 100 to the hydraulic circuits of tools, implements and/or machinery (such as the tool, in particular the rototiller 200) applied to the rear of the tractor (e.g. by means of the three-point connector, but also towed). Additional terminal assemblies may be provided for tools, implements and/or machinery applied to the tractor at the front and/or laterally, as in the case of front loader 201. The coupling and/or connecting features and/or methods of the rear terminal assembly 101 will be described below, for the sake of brevity as the following description also applies to different terminals, e.g. side and/or front terminals.

As depicted in FIG. 2, the terminal or valve assembly 101 comprises a plurality of female couplings 11, 12, each of which can be mechanically and hydraulically connected to a corresponding male coupling 21, 22. The methods for mechanically and hydraulically coupling the couplings 11, 12 respectively with the couplings 21 and 22 vary according to the type of coupling; same are also substantially known and therefore a detailed description is not provided for the sake of conciseness. It is solely specified that a hydraulic connection is established between the circuits respectively upstream of the female couplings 11, 12 (in the case shown) and downstream of the male coupling 21, 22 (again in the case shown) by mechanically coupling the female and male couplings and that the valve assembly 101 may comprise either the female and/or male couplings, wherein the tool or apparatus 200, 201 can be correspondingly equipped with male and/or female couplings, respectively.

The present invention finds also advantageous application in the case of multiple connectors provided with a plurality of couplings which allow the simultaneous connection of said couplings to those of a moveable terminal of a tool and/or apparatus.

Figure 3:
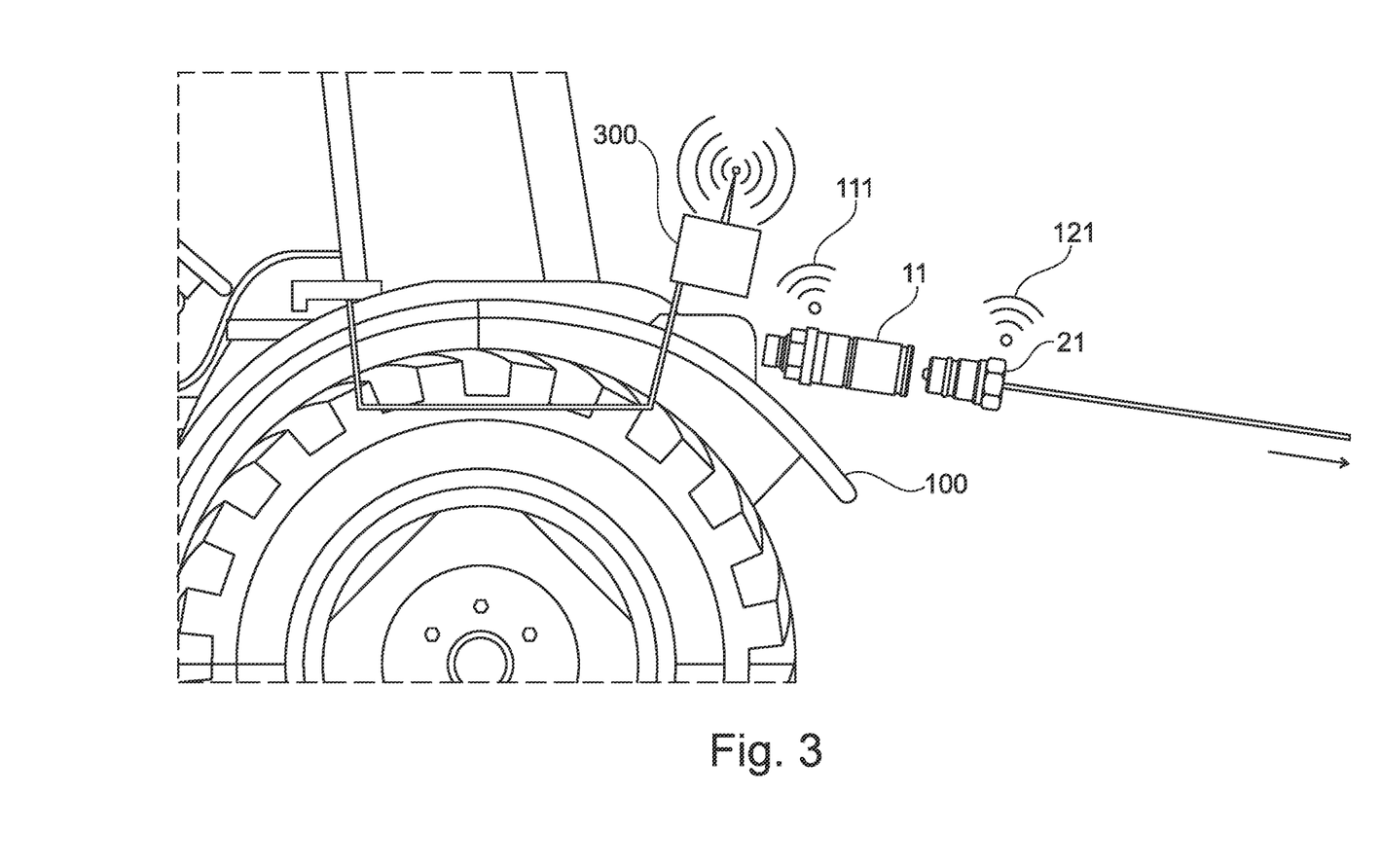
FIG. 3 shows a schematic view of an embodiment of the present invention.

FIG. 3 shows the innovative concept underlying the present invention.

As depicted, the female coupling 11 is equipped (according to solutions and/or methods described in detail below) with a detection sensor 111, while the male coupling 21 is equipped with a sensor 121. Obviously, in the case of a multiple terminal, each of the respective couplings, according to the invention, may be equipped with a corresponding sensor, wherein moreover, according to the present invention, even only one of the male and female couplings of a connector can be equipped with a sensor.

The sensors 111 and 121 (or at least one of the two) are configured to monitor the functionality and/or the actual conditions of use of the connector in particular, according to the invention, the data which can be detected by the sensor 111 and/or the sensor 121 comprise:

absence or presence of fluid flow between said male 21 and female 11 couplings, pressure value of said fluid inside said connector, temperature value of said fluid inside said connector, total time of presence of fluid between said male 21 and female 11 couplings.

Either alternatively or additionally, the sensor 111 and/or the sensor 121 may be configured to detect and/or verify the correct or incorrect hydraulic connection between the male 21 and female 11 couplings. Furthermore, the sensor 121 may be configured so as to detect the pressure of said fluid inside said male coupling 21 and in the absence of connection between said male 21 and female 11 couplings.

Again with reference to FIG. 3, reference numeral 300 identifies a unit or communication control unit specifically configured to at least receive the data detected by the sensors 111 and/or 121 from the sensors themselves and summarized above.

In particular, according to the present invention, the communication between the control unit 300 and the sensors 111 and/or 121 (one-way at least from the sensors to the control unit, but possibly also two-way from the sensors to the control unit and vice versa) can be wireless, in particular in BLUETOOTH mode, but possibly via WI-FI.

Moreover, according to the present invention, a communication is provided (wired or wireless, e.g. BLUETOOTH, but possibly via WI-FI), between the control unit 300 and a control unit accessible to an operator, e.g. provided in the cab of the tractor 100 and equipped with an interface for viewing the data collected by the sensors and/or configured to allow the insertion of instructions and/or requests by the operator, e.g. with touch-screen technology.

Furthermore, the control unit 300 may be provided with a calculation and/or processing unit for processing the data transmitted by the sensors 111 and/or 121, e.g. for extrapolating the data themselves and/or calculating weighted averages, preparing statistics or similar operations.

Then, according to an embodiment of the present invention, an application which can be downloaded to smartphones and/or tablets is also provided for the remote management of the control unit 300, i.e. for displaying the data processed by the control unit 300 and/or entering instructions as through the control unit provided in the cab.

Figure 4:
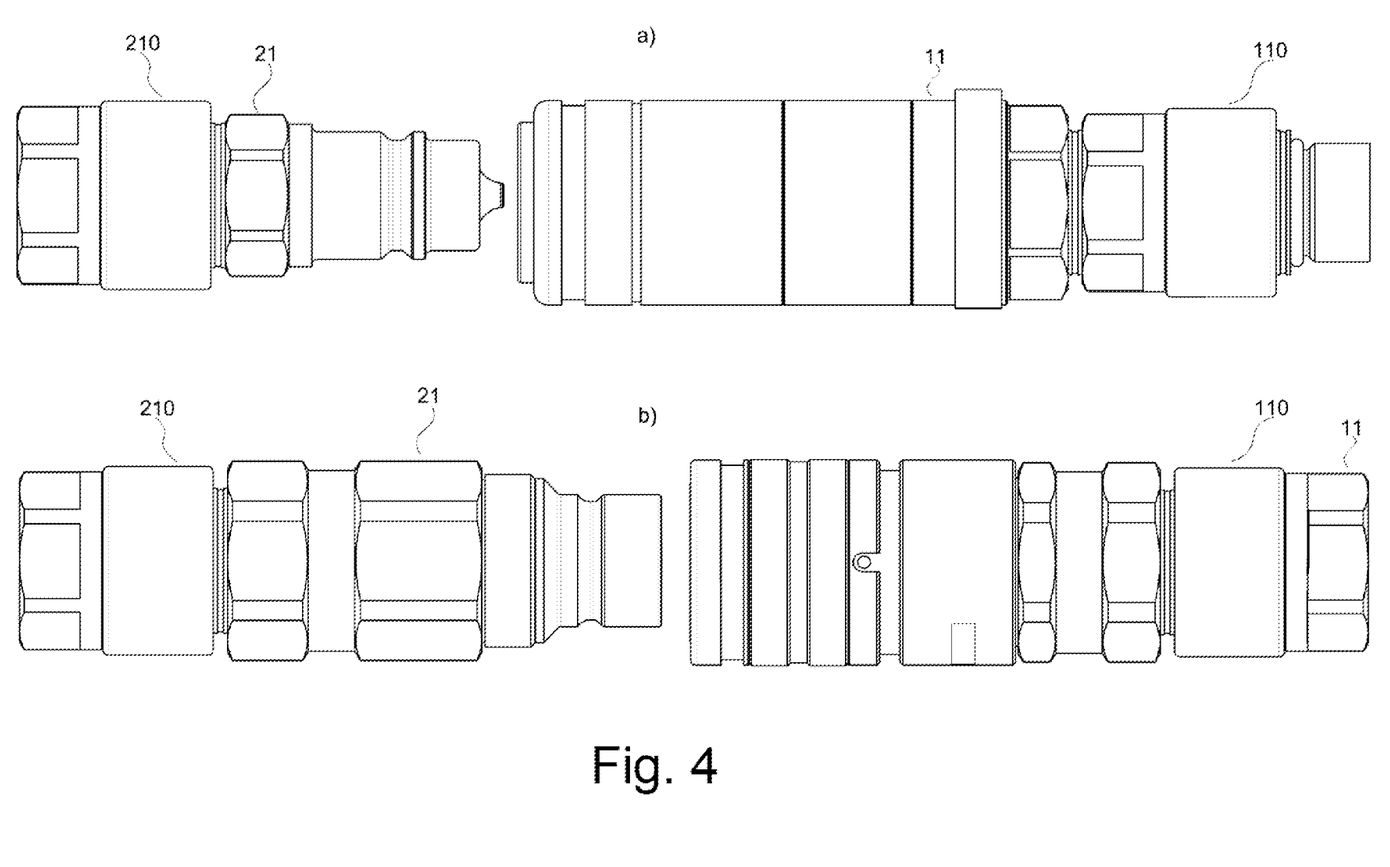
FIG. 4 shows schematic views of possible implementations of the present invention.

FIG. 4 shows two possible solutions for integrating the sensors in the female and/or male couplings.

In particular, according to the solution in FIG. 4a, the sensor 111 (not shown in the figure) is housed in the inner space defined by a hollow element 110, in turn threaded onto the female coupling 11, the sensor 121 (not shown in the figure) being similarly housed in the inner space defined by a hollow element 210 of the male coupling 21.

The solution according to FIG. 4b is substantially similar to that of FIG. 4a, wherein FIG. 4b shows a male coupling 21 and a corresponding female coupling 11 of type "flat-face", the sensors 111 and 121 being also in this case housed in the inner spaces defined by hollow elements 110 and 210 respectively of the female 11 and male 21 couplings.

Figure 5:
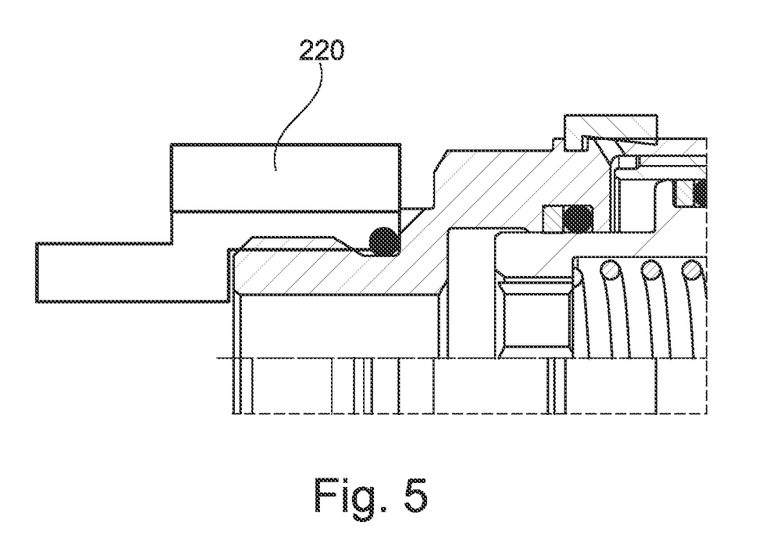
FIG. 5 shows a schematic view of an embodiment of the present invention.

FIG. 5 instead shows a possible solution for applying sensors to couplings which do not have hollow elements which define an inner space suited to accommodate one or more sensors. In this case, as depicted, an additional hollow element 220 which is applied externally to the both female 11 and male 21 coupling is provided, said additional hollow element being shaped so as to define the inner space suited for housing the sensor (not shown in the figure).

It has thus been demonstrated by means of the above detailed description of the embodiments of the present invention depicted in the drawings that the present invention allows to achieve the predetermined objects by overcoming the drawbacks affecting the prior art.

In particular, the present invention allows the direct monitoring of at least the main parameters of a hydraulic circuit, in particular at a connector, e.g. a quick connector and/or of the push-pull type.

Furthermore, the present invention also provides a solution which allows the direct verification of the actual or missing or even incorrect connection of the couplings of a connector, characterized by low costs, and which can be made and installed through simple and quick operations, and the installation of which on couplings of known type does not require modifications, at least not substantial modifications, of the couplings themselves.

Although it is explained above by means of a detailed description of the embodiments shown in the drawings the present invention is not limited to the embodiments described above and shown in the drawings. Conversely, all the modifications and/or variants of the embodiments described above and shown in the drawings which will appear obvious and immediate to a person skilled in the art are included in the scope of the present invention.

For example, the number and type of sensors and the data which can be detected by them may vary in the scope of the present invention, according to needs and/or circumstances.

The scope of the present invention is thus defined by the claims.

We claim:

1. A hydraulic connector for hydraulic circuits comprising:
    a female coupling and a male coupling which are configured to directly couple with and decouple from each other, wherein a mutual connection of said female and male couplings facilitates flow of a fluid between said female and male couplings, a first hollow element applied directly to an external surface of said male or female coupling to define a first inner space, a first sensor positioned in said first inner space formed by said first hollow element, the first sensor being configured to detect and electronically transmit signals corresponding to working and/or operating parameters and/or values of said connector to a receiver;
    a second hollow element applied directly to an external surface of the other of said male or female coupling to define a second inner space, a second sensor positioned in said second inner space formed by said second hollow element, and the second sensor configured to detect working and/or operating parameters and/or values of said connector; and
    wherein said first sensor is configured to detect one or more parameters associated with the fluid including: absence or presence of fluid flow between said male and female couplings, pressure value of said fluid inside said connector, temperature value of said fluid inside said connector, and total time of presence of fluid between said male and female couplings.

2. The hydraulic connector according to claim 1, wherein at least one of said first sensor and second sensor is configured to detect whether said male and female couplings are connected correctly.

3. The hydraulic connector according to claim 1, wherein said second sensor is configured to detect at least one of the following parameters: absence or presence of fluid flow between said male and female couplings, pressure value of said fluid inside said connector, temperature value of said fluid inside said connector, and total time of presence of fluid between said male and female couplings.

4. The hydraulic connector according to claim 1, wherein either one of said first and second sensors is configured to detect a pressure of said fluid inside said connector and an absence of connection between said male and female couplings.

5. An integrated system comprising the hydraulic connector according to claim 1, the integrated system further comprising a communication unit including the receiver, wherein said communication unit and said first sensor are configured to communicate with each other to allow at least the transmission of said parameters and/or values from said first sensor to said communication unit.

6. The integrated system according to claim 5, wherein said communication unit and said first sensor are configured to communicate with each other via a wireless network.

7. The integrated system according to claim 6, wherein said communication unit is configured to perform a comparison between the one or more parameters and/or values detected by said first and/or second sensor and corresponding predetermined parameters and/or values, and to generate an alarm signal if differences between detected parameters and/or values and the predetermined parameters and/or values are higher than predetermined tolerances.

8. An operating machine comprising a hydraulic circuit, said operating machine including the integrated system according to claim 7.

9. The operating machine according to claim 8, further comprising a control unit with an operator interface, wherein said control unit and said communication unit are configured to communicate with each other.

10. The operating machine according to claim 9, wherein communications between said control unit and/or said communication unit enables verification of said one or more parameters and/or values by an operator through said interface.

11. An integrated system comprising the hydraulic connector according to claim 1, the integrated system further comprising a communication unit, wherein said communication unit and at least one of said first and second sensors is configured to communicate with each other to allow at least the transmission of said parameters and/or values from said first and/or second sensor to said communication unit.

12. An operating machine comprising a hydraulic circuit, said operating machine being equipped with the hydraulic connector according to claim 1.

13. A tool comprising a first hydraulic circuit configured to be operatively connected to a second hydraulic circuit corresponding to a main operating machine, said tool being equipped with the hydraulic connector according to claim 1.

14. An operating machine-tool system comprising the main operating machine and the tool according to claim 13.

* * * * *